United States Patent
De Gaillard

(10) Patent No.: US 6,830,290 B2
(45) Date of Patent: Dec. 14, 2004

(54) MOTOR VEHICLE WITH A VEHICLE ROOF WHICH CAN BE OPENED

(75) Inventor: Francois De Gaillard, Mouilleron en Pareds (FR)

(73) Assignee: Webasto Vehicles Systems International GmbH, Stockdorf (DE)

(*) Notice: Subject to any disclaimer, the term of this patent is extended or adjusted under 35 U.S.C. 154(b) by 0 days.

(21) Appl. No.: 10/391,201

(22) Filed: Mar. 19, 2003

(65) Prior Publication Data
US 2003/0214157 A1 Nov. 20, 2003

(30) Foreign Application Priority Data
Mar. 19, 2002 (DE) .......................... 102 12 241

(51) Int. Cl.⁷ ................................ B60J 7/047
(52) U.S. Cl. ..................... 296/216.03; 296/216.05; 296/220.01; 296/146.15
(58) Field of Search .............. 296/216.03, 216.05, 296/220.01, 146.15

(56) References Cited

U.S. PATENT DOCUMENTS

| | | | |
|---|---|---|---|
| 5,709,426 A | | 1/1998 | De Rees et al. |
| 6,158,803 A | * | 12/2000 | Reihl et al. ............ 296/216.04 |
| 6,672,658 B2 | | 1/2004 | De Gaillard |
| 2002/0125743 A1 | * | 9/2002 | Bohm et al. ........... 296/216.04 |

FOREIGN PATENT DOCUMENTS

| | | |
|---|---|---|
| DE | 197 13 347 C1 | 5/1999 |
| DE | 198 45 734 A1 | 4/2000 |
| DE | 199 07 333 C1 | 5/2000 |
| EP | 865948 A2 * | 1/1998 |

* cited by examiner

Primary Examiner—Dennis H. Pedder
(74) Attorney, Agent, or Firm—Nixon Peabody LLP; David S. Safran

(57) ABSTRACT

Motor vehicle, especially a limousine, sedan or coupe, with a vehicle roof (2) with body-mounted side roof members (3), with a movable cover (9) which adjoins the front window (7) for closing and clearing a roof opening (6) which is formed in the vehicle roof (2), and with a rear window (8) which borders the roof opening, the cover (9). The cover is movably guided by a front bearing mechanism (17) and a rear bearing mechanism (19) on the front and the rear roof-mounted longitudinal guides (10 and 11) and can be raised for clearing the roof opening (6) at least at its rear edge and can be pushed over the rear window (8). The front and the rear roof-mounted longitudinal guides (10 or 11) are located countersunk with respect to the roof surface in the area of the two roof side members (3) and the rear longitudinal guides (11) run along the side edges of the rear window (9).

12 Claims, 4 Drawing Sheets

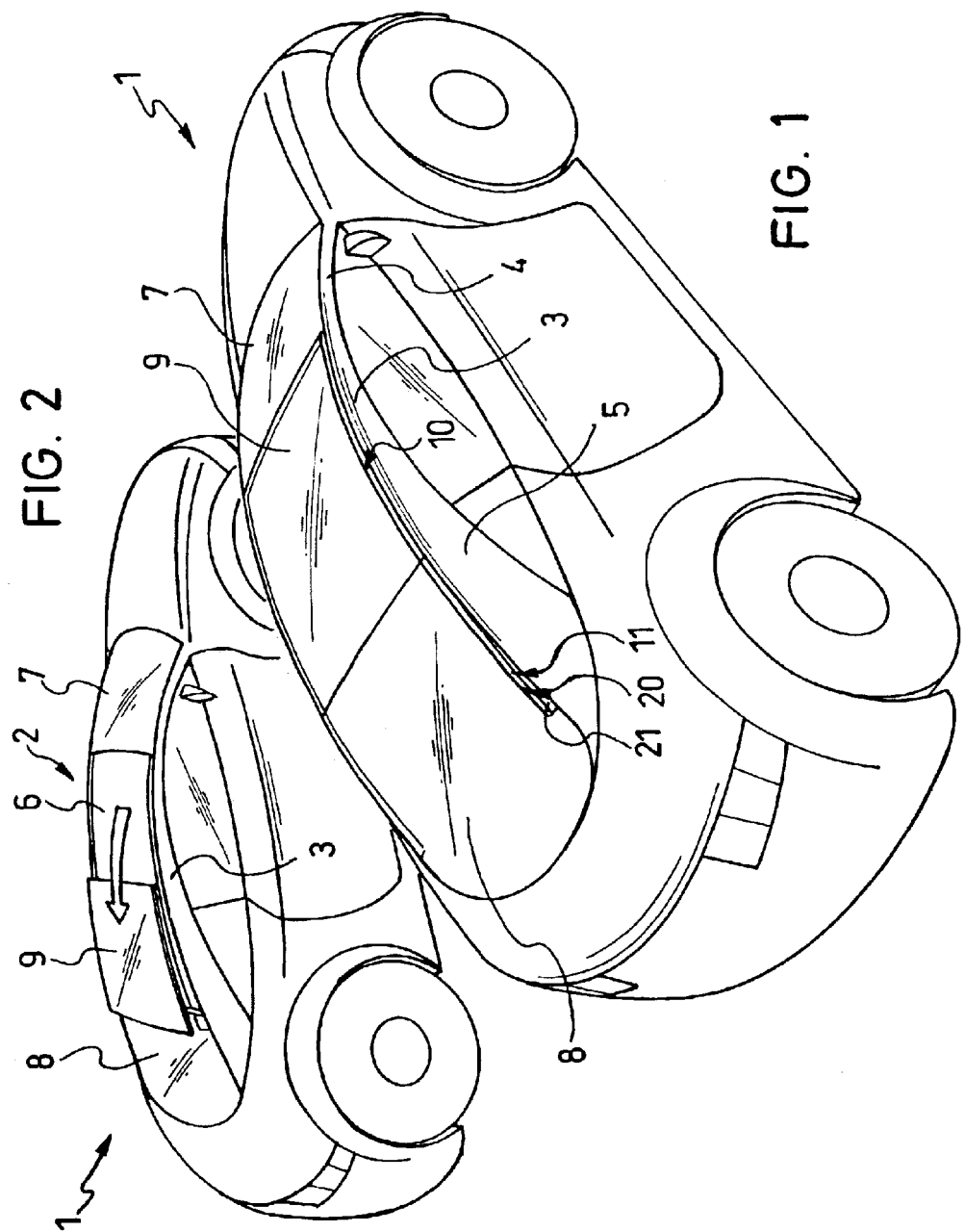

MOTOR VEHICLE WITH A VEHICLE ROOF WHICH CAN BE OPENED

BACKGROUND OF THE INVENTION

1. Field of the Invention

The invention relates to a motor vehicle, especially a limousine, sedan or a coupe, with a vehicle roof having body-mounted side roof members, a movable cover which adjoins the front window for closing and clearing a roof opening which is formed in the vehicle roof, and with a rear window which borders the roof opening.

2. Description of Related Art

German Patent DE 197 13 347 C1 discloses a motor vehicle with a vehicle roof which has a roof opening which extends between the two opposing side roof members. A movable cover, with which the roof opening can be selectively closed or cleared, is movably supported, on each side in the area of its front edge, by means of a respective carriage on guide rails which are located on the inner sides of the side roof members. The cover is supported by means of support levers which are coupled laterally in the area of the rear roof edge and which can be moved to the rear in guides located below the level of the fixed roof skin along the rear fixed roof part and upon upwardly emerging, partially displace a flexible sealing element which is located between the side roof members and the rear fixed roof part. When the cover is opened, the support levers which move with the cover form a stable support of the rear section of the cover. Since the cover can move solely over the fixed roof part, for a comparatively short vehicle roof, the roof opening can likewise have only a comparatively short length.

SUMMARY OF THE INVENTION

The primary object of the present invention is to devise an improved roof structure for a motor vehicle of the initially mentioned type.

This object is achieved by a motor vehicle, especially a limousine or a coupe, with a vehicle roof with body-mounted side roof members, with a movable cover which adjoins the front window for closing and clearing a roof opening which is formed in the vehicle roof, and with a rear window which borders the roof opening, in which the cover is movably guided by a front bearing means and a rear bearing means on front and rear roof-mounted longitudinal guides and is raised, at least at its rear edge, for clearing the roof opening and for being pushed over the rear window, the front and the rear roof-mounted longitudinal guides being located countersunk in the area of the two roof side members with respect to the roof surface and the rear longitudinal guides running along the side edges of the rear window.

Since in the vehicle roof in accordance with the invention which can be opened by means of a movable cover the rear longitudinal guides run along the side edges of the rear window, the cover which is additionally supported securely in the area of its rear edge can be moved to the rear over the rear window so that a large roof opening can be cleared. In this way a vehicle roof can be easily built with only one large roof opening and a rear window and with few separation points. According to the continuous run of the side roof members from the A columns to the rear into the C columns or the body on the trunk the closed over passes continuously into the rear window.

The rear longitudinal guides can run along the entire length of the rear window or can end in front of the back end of the rear window, in this case the rear window feasibly bordering the rear longitudinal guides and the sections of the side roof members, which sections lie behind the longitudinal guides, so that a continuous roof surface is formed.

If the vehicle roof is tapered, the distance between the rear longitudinal guides parallel to one another and the respective side roof member is feasibly covered by a screen. Thus, the side roof member can be formed over its length with an essentially unchanged cross sectional profile.

Preferably, each side roof member contains a bearing flange which is located on the inside, i.e., toward the center longitudinal plane of the vehicle, and on which the rear longitudinal guide is located. In addition, the bearing flange, further inward of the longitudinal guide, can have a support for supporting the rear window so that the rear window can be mounted without any adverse affect by the longitudinal guides.

One embodiment of the vehicle is explained in detail below with reference to the accompanying drawings.

BRIEF DESCRIPTION OF THE DRAWINGS

FIG. 1 is a top side perspective view of a motor vehicle with a vehicle roof in accordance with the invention and a cover which closes the roof opening;

FIG. 2 shows the vehicle with the cover pushed to the rear over the rear window;

DETAILED DESCRIPTION OF THE INVENTION

Figure 7:
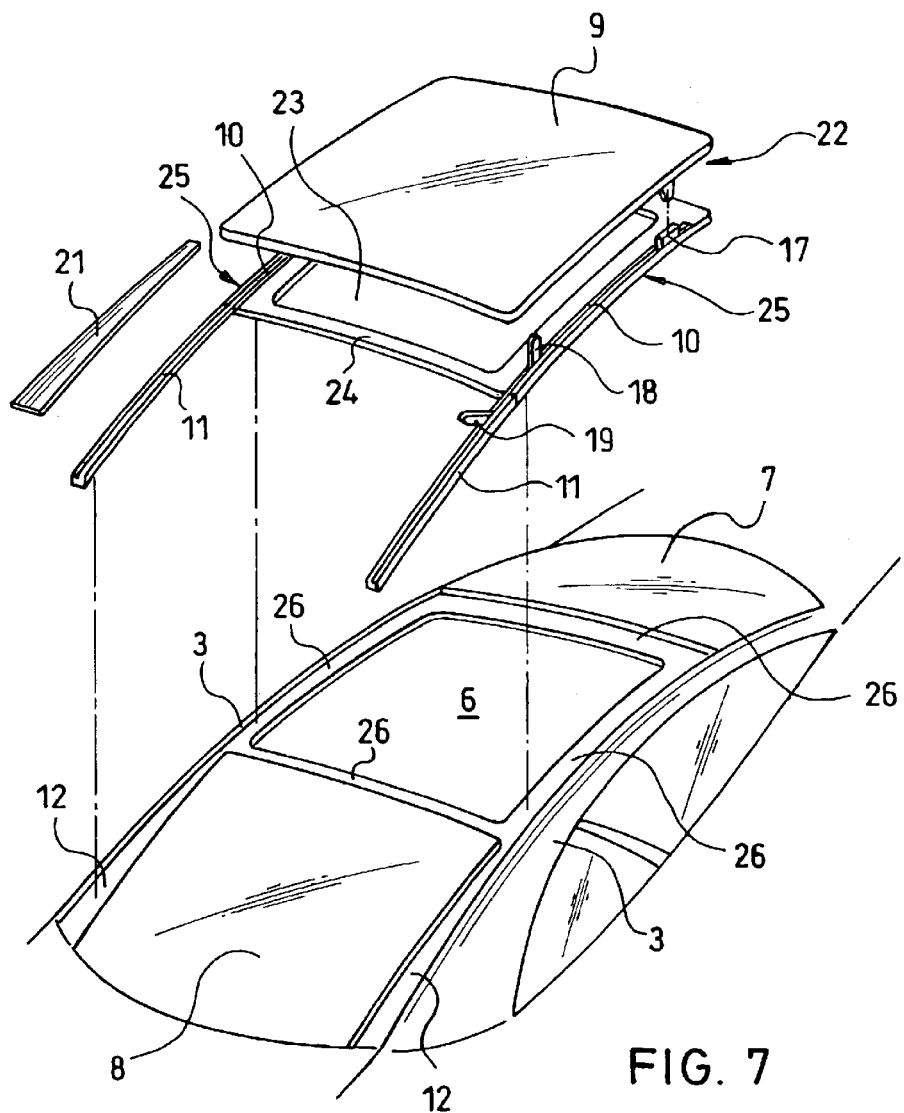
FIG. 7 is an exploded view of the motor vehicle roof in accordance with the invention with a cover unit which contains the cover and bearing rails for mounting on the vehicle roof.

A motor vehicle 1, such as, for example, a passenger car, for example, a fastback, or a coupe (see, FIG. 1) has a roof 2 with two side roof members 3 which adjoin the A columns 4 to the front and pass to the rear into the C columns 5 or assume their function. Between the two side roof members 3, there extends a roof opening 6 (see FIG. 2) which borders the front window 7 at the front and the rear window 8 to the rear, and which is securely attached to the side roof members 3. The roof opening 6 can be selectively closed (FIG. 1) or at least partially cleared (FIG. 2) by means of a movable cover 9, especially a transparent cover or glass cover. The cover 9 is movably supported on two front longitudinal guides or guide rails 10 (see FIG. 7) and on two rear longitudinal guides or guide rails 11. The front guide rails 10 are aligned parallel to one another in the longitudinal direction of the roof and are attached to the inside bearing flange (not shown) of the respective side roof member 3 or to a frame which is attached thereto (for example, on the frame 24 in FIG. 7). They extend on the side roof member 3 essentially over the length of the roof opening 6.

Figure 5:
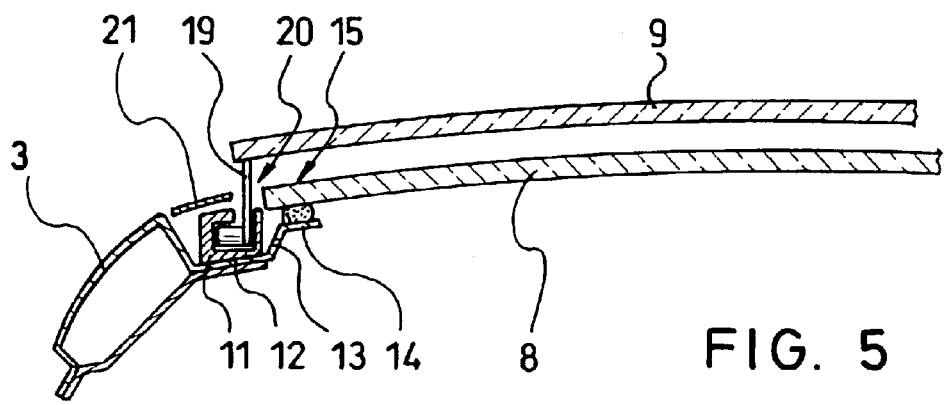
FIG. 5 is a partial cross sectional view along line 5—5 in FIG. 4 of the vehicle roof with the cover opened.
Figure 6:
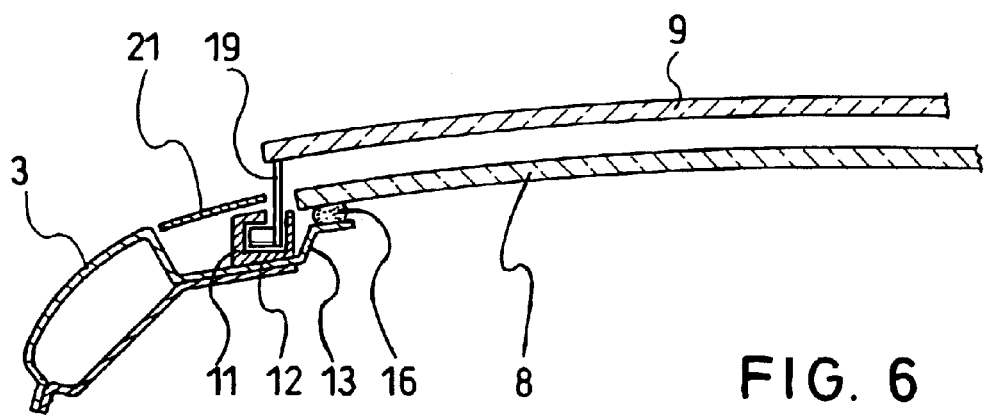
FIG. 6 is a partial cross sectional view along line 6—6 in FIG. 4 of the vehicle roof with the cover opened.

The two rear guide rails 11, which are parallel to one another, adjoin the front guide rails 10 with or without a spacing interval or are formed as one-piece extensions of the front guide rails 10. The rear guide rails 11 are also attached to a respective inside bearing flange 12 of the side roof member 3 (FIGS. 5 & 6) which is also used as a gutter. The bearing flange 12 has an inside section 13 pointed upward with a support surface 14 for the side edge 15 of the rear window 8 which is attached to the support surface 14 by means of adhesive 16.

The bearing means for the cover 9 contains two carriages 17 which are movably guided on the front guide rails 10 (see FIG. 7) which are connected in the area of the front edge of the cover 9 to be able to pivot with it and especially also to be able to move vertically, two raising levers 18 which are supported to swing out on the front guide rails 10 to raise the rear edge of the cover 9, and two support levers 19 which are supported to be able to move and to be raised on the rear guide rails 11 and which are coupled to the rear section of the cover 9.

The cover 9 is pushed between its open position and its closed position by a drive means (not shown) which, for example, engages the front carriage 17 via drive cables. In order to move the cover 9 to the rear into its open position, the raising levers 18 swing up, lifting the rear edge of the cover 9 via the rear window 8 which lies directly behind. When the cover 9 is raised, each support lever 19 is swung up out of its covered position so that it extends through a gap 20 which runs via the rear guide rail 11 between the rear window 8 and the screen 21. The screen 21 forms a termination which flush with the roof skin or a transition from the side roof member 3 to the rear window 8 above the bearing flange 12 which lies at a lower level and partially covers the guide rail 11. The support lever 19 is pushed to the rear jointly with the cover 9 in its position which projects upward through the gap 20, the raised rear edge of the cover 9 being pushed over the rear window 8 which lies behind. The gap 20 can additionally be covered by a movable cover such as, for example, by a movable sealing element (not shown) if the cover 9 is closed, the support lever 19 elastically displacing the sealing lip while it is being pushed to the rear with the cover 9 along the gap 20.

This type of support of the cover 9, by itself, forms no part of this invention and is made, for example, according to the manner disclosed in U.S. Pat. No. 6,158,803 for a cover which can be pushed to the rear above the fixed vehicle roof over an additional rear roof part. Reference is made expressly to the disclosure of U.S. Pat. No. 6,158,803 especially with respect to the support of the cover (see raising lever 27 and support lever 43 in U.S. Pat. No. 6,158,803 and the guide rails.

The cover 9 which is raised at its rear edge, while it is being pushed over the rear window 8 which lies to the rear, is guided very stably by means of its front support (carriage 17) on the front guide rails 10 and its rear support by the support lever 19 on the rear guide rails 11.

A cover unit 22 (FIG. 7) contains a bearing frame 24 which surrounds a frame opening 23 and which borders the roof opening 6 in the installation position on the vehicle roof 2. The front guide rails 10 are attached to the side frame parts 25 of the bearing frame 24. The rear guide rails 11 extend from the side frame parts 25 to the rear. The cover 9 is mounted on this cover unit 22 which can be mounted prefabricated at its intended installation site on a roof mounted frame 26. In doing so, the rear guide rails 11 are mounted on the bearing flanges 12 before installation or after installation of the rear window 8 on the support surfaces 14 of the bearing flange 12. This configuration enables greater freedom in installation of the roof.

Figure 4:
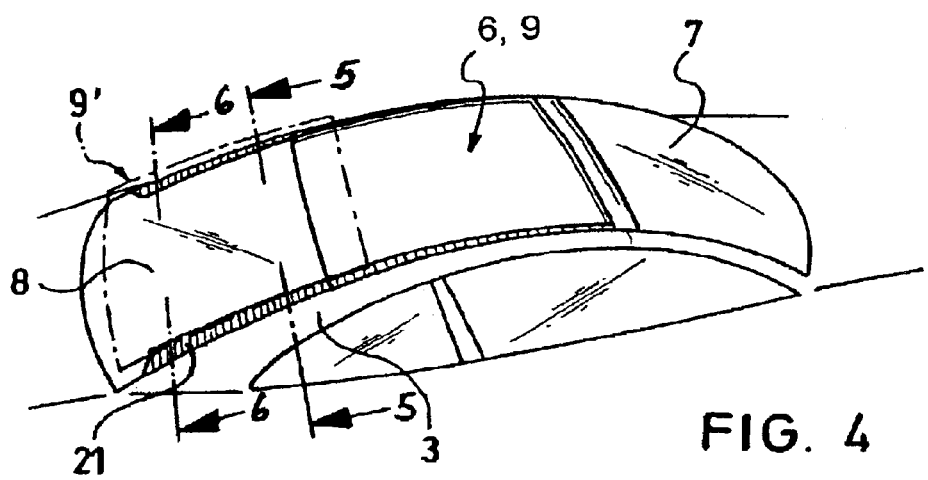
FIG. 4 is a top side view of the motor vehicle with the vehicle roof in accordance with the invention as shown in FIG. 1.

Since the rear guide rails 11 run on the side edge of the rear window 8 in the longitudinal direction along part of the rear window or over the entire length of the rear window 8, the cover 9 can be moved accordingly far to the rear over the rear window 8 (see FIG. 4, cover 9' shown by the dotted line). Thus, in the vehicle roof in accordance with the invention with a long roof opening 6 and a following rear window 8, a correspondingly long cover 9 can be moved completely over the rear window 8 so that, especially for the same length of the roof opening 6 or of the cover 9, a large roof opening can be completely cleared.

Figure 3:
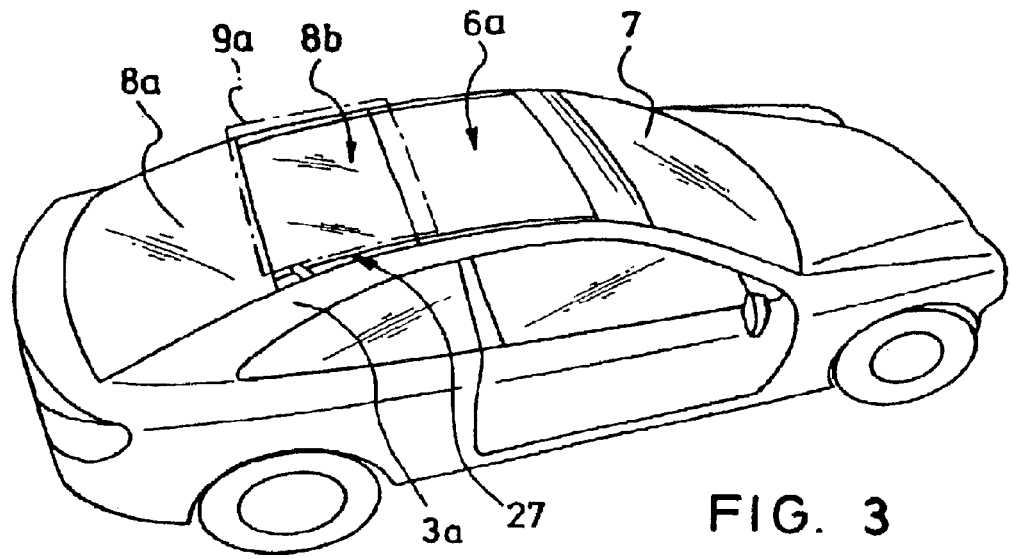
FIG. 3 shows in a top side view a generic motor vehicle with a vehicle roof according to the prior art.

In the known existing Mercedes Benz sport coupe of the C class on the other hand (see for example, FIG. 3) between the roof opening 6*a* and the rear window 8*a* which is mounted seamlessly on the side roof members 3*a*, an additional roof part 8*b* is securely attached to the side roof members, in the lateral depressions 27 between the roof part 8*b* and the side roof member 3*a*, the cover 9*a* being guided by its bearing means. This roof configuration, in which the rear guide rails of the cover 9*a* end on the front edge of the rear window 8*a*, requires a larger number of roof components and allows only a smaller roof opening 6*a*.

If the rear guide rails 11 do not run as far as the back end of the rear window 8 (see FIG. 1), for example, the rear window 8, in the longitudinal direction behind the gap 20, is made wider and extends directly to the side roof member 3 so that a screen is not necessary in this area.

In a tapered vehicle roof which is narrower, with respect to the longitudinal direction of the roof, in its middle than in its front section or rear section, the side roof members run curved in a top view and to the outside from the middle area to the rear section (see the location of the cutaway views 5—5 and 6—6 in FIG. 4). Accordingly, the holding frame for the rear guide rail 11 widens on the bearing flange 12 which is covered by the screen 21 which changes in its width.

Basically, for the vehicle roof, instead of a glass cover 9, a cover of transparent plastic or a cover of transparent and nontransparent areas can be used.

What is claimed is:

1. Motor vehicle, comprising:
 a vehicle body;
 front and rear windows;
 a vehicle roof with side roof members mounted to the vehicle body, with a movable cover which adjoins the front window for closing and clearing a roof opening which is formed in the vehicle roof, the roof opening bordering the rear window;
 roof-mounted front and rear longitudinal guides;
 wherein the cover is movably guided by a front bearing means and a rear bearing means on the front and the rear longitudinal guides, wherein the rear bearing means has a lifting means for raising the cover at least at its rear edge for clearing the roof opening and being pushed over the rear window; and
 wherein, in an area of the two roof side members, the front and the roof-mounted rear longitudinal guides are located countersunk with respect to the roof surface and wherein the rear longitudinal guides run along side edges of the rear window.

2. Motor vehicle in accordance with claim 1, wherein the rear longitudinal guides end in front of a back end of the rear window, and the rear window laterally borders the rear longitudinal guides and sections of the side roof members which lie behind the longitudinal guides.

3. Motor vehicle in accordance with claim 1, wherein the rear longitudinal guides are parallel with respect to each other, wherein the vehicle roof is tapered and a spacing between the rear longitudinal guides and the respective side roof member is covered by a screen.

4. Motor vehicle in accordance with claim 1, wherein each side roof member contains an inside bearing flange on which the rear longitudinal guide is located and wherein the bearing flange has a support for supporting the rear window which is located inward of the rear longitudinal guide.

5. Motor vehicle in accordance with claim 1, wherein the wherein the lifting means comprises a raising lever for raising the back end of the cover and a support lever which is mounted to swing out for supporting the cover when pushed into a rear open position.

6. Motor vehicle in accordance with claim 1, wherein the cover unit has a bearing frame for mounting on the vehicle roof and wherein the front longitudinal guides and the rear longitudinal guides are located on the bearing frame.

7. Motor vehicle in accordance with claim 1, wherein the cover extends on each side to the side roof members.

8. Motor vehicle in accordance with claim 2, wherein the rear longitudinal guides are parallel with respect to each other, wherein the vehicle roof is tapered and a spacing between the rear longitudinal guides and the respective side roof member is covered by a screen.

9. Motor vehicle in accordance with claim 8, wherein each side roof member contains an inside bearing flange on which the rear longitudinal guide is located and wherein the bearing flange has a support for supporting the rear window which is located inward of the rear longitudinal guide.

10. Motor vehicle in accordance with claim 9, wherein the rear bearing means has a raising lever for raising the back end of the cover and a support lever which is mounted to swing out for supporting the cover when pushed into a rear open position.

11. Motor vehicle in accordance with claim 10, wherein the cover unit has a bearing frame for mounting on the vehicle roof and wherein the front longitudinal guides and the rear longitudinal guides are located on the bearing frame.

12. Motor vehicle in accordance with claim 11, wherein the cover extends on each side to the side roof members.

\* \* \* \* \*